C. L. STORY.
Improvement in Transplanters.
No. 131,070.  Patented Sep. 3, 1872.
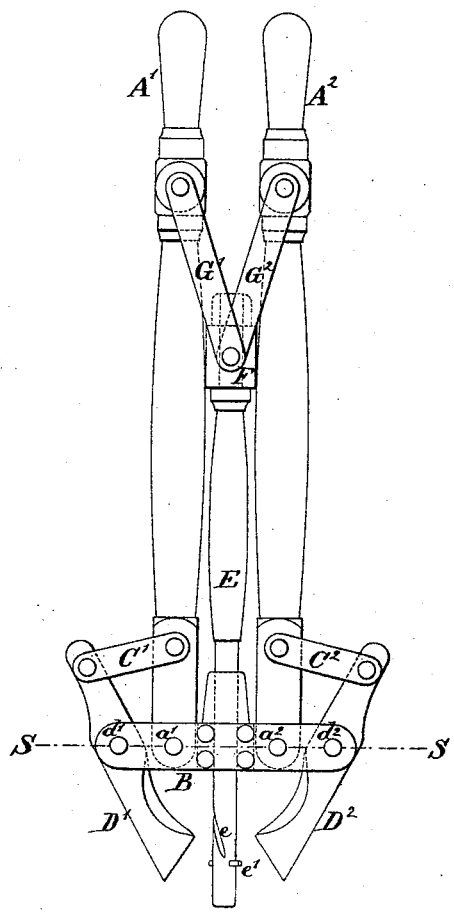
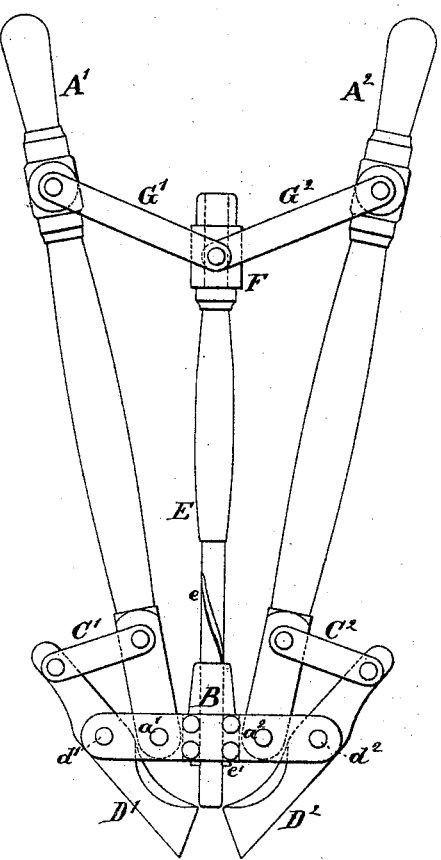
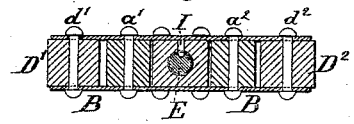
Witnesses:  Inventor:

UNITED STATES PATENT OFFICE.

CHARLES L. STORY, OF CALHOUN, KENTUCKY.

IMPROVEMENT IN TRANSPLANTERS.

Specification forming part of Letters Patent No. 131,070, dated September 3, 1872.

Specification describing a certain Improvement in Plant-Setting Device, invented by C. L. STORY, of Calhoun, McLean county, Kentucky.

It is adapted to operate rapidly, easily, and with great efficiency in thrusting into the ground and properly pressing the earth around the roots of the tobacco-plants. The plants are thrown on the ground by a child or other attendant in the positions which they are to respectively occupy, and lie flat thereon. The instrument is applied on the end of the root and presses it downward into the earth, thereby tilting up the plant and partially burying the root in the earth. During the withdrawing movement of the presser two other pieces come into play and draw the earth toward the root on two opposite sides and properly embed it. The mechanism is peculiarly adapted to produce an efficient machine with little weight or cost. The parts may be nearly all of wood. It requires no wheels or other expensive parts, and is eminently a hand-machine.

The following is a description of what I consider the best means of carrying out the invention. The accompanying drawing forms a part of this specification.

Figure 1 is a side elevation with the handles closed together, and consequently the thrusting part, which I will call the shaft, depressed. Fig. 2 is a horizontal section on the line S S in Fig. 1. Fig. 3 is a side view corresponding to Fig. 1, but with the handles spread apart and, consequently, with the shaft elevated. The side pieces or earth-gatherers are in this latter figure represented as drawn together to compress the earth around the root of the plant.

Similar letters of reference indicate like parts in all the figures.

$A^1$ $A^2$ are handles on the upper ends of levers, pivoted at their respective bases $a^1$ $a^2$ to a horizontal piece, B, which forms what may perhaps be called the fixed frame-work of the machine. The levers $A^1$ $A^2$ are connected by links $C^1$ $C^2$ to sub-levers or earth-gatherers $D^1$ $D^2$. The latter are pivoted to the frame-piece B at the points $d^1$ $d^2$, and are adapted by their form and arrangement to enter the earth sharply, and, as the handles $A^1$ $A^2$ are moved apart, to compact the earth firmly together around the tobacco-root, which has been previously pressed down between them. The root is pressed down by a vertically-moving punch or shaft, E. This latter is guided in a hole in the frame-piece B, and is capable only of a vertical motion and of a turning or screw-like motion. This latter is insured by the presence of a pin, I, which is thrust in laterally through the frame-piece B, and stands in a helical groove, $e$, formed in the surface of the shaft E. Near the upper end of the shaft E is loosely mounted a short sleeve, F, which has projecting pins on its two sides, which form pivots for links $G^1$ $G^2$, which connect this sleeve F to pins on the levers $A^1$ $A^2$. The sleeve F is confined loosely on the shaft E, there being a collar below it and a nut or other suitable head above. There is a cross-pin, $e'$, near the lower end of the shaft E.

The attendant, grasping the handles $A^1$ $A^2$ with his two hands, lifts the machine, and, placing the lower end of the shaft E upon the end of the root of the tobacco-plant, presses downward upon the machine, still holding the handles together. This movement sinks the shaft E into the earth and carries with it the tobacco-root, which it at the same time turns into an upright position. Now the operator moves the handles $A^1$ $A^2$ apart, and then, drawing them slightly together again, lifts the entire machine. The spreading apart of the handles $A^1$ $A^2$ operates the levers $D^1$ $D^2$ to draw the earth together compactly around the root, and also to elevate the shaft E. The relaxing movement, drawing the handles slightly together again, liberates the compressed earth around the root and leaves the entire machine free to be lifted without disturbing anything. During or after the lifting the handles $A^1$ $A^2$ are again brought together and the machine is in condition for being again pressed down, again operated and lifted, and so on indefinitely.

The machine is especially adapted for tobacco-planting, and it is intended mainly for such use; but there may be many other branches of agricultural or horticultural operations in which it may be successfully used. Cuttings of grape, and perhaps various other varieties of plants, may be thrust into the ground and properly supported in the earth with very great rapidity and success by its use. I do not confine its use to any particular branch of planting or transplanting.

What I have termed the frame-piece B forms the guide for the shaft or punch E and supports the pivots or fulcrums of the levers $A^1$ $A^2$ and sub-levers $D^1$ $D^2$. It is made in the machine represented by two plates of metal drilled or punched to receive the pivots and bolts, and fixed one on each side of a wooden central piece which forms a long round bearing or guide for the shaft E.

I claim as my invention—

1. The punch E, toggle-links $G^1$ $G^2$, and handles $A^1$ $A^2$, in combination with each other and with the side pressers $D^1$ $D^2$, operated from the handles $A^1$ $A^2$ so as to be closed as the handles are opened, all substantially as herein specified.

2. The punch E, links $G^1$ $G^2$, and handles $A^1$ $A^2$, in combination with the parts $D^1$ $D^2$ mounted as separate sub-levers, connected by links $C^1$ $C^2$, all arranged and operating as specified.

3. The punch E mounted in bearings which allow it to rotate while moving vertically, and having a helical groove, $e$, in combination with the internal projection I matching in said groove so as to combine the revolving with the vertical motion, all substantially as herein specified.

4. The entire combination of all the details, namely, the handles $A^1$ $A^2$, sub-levers $D^1$ $D^2$, links $C^1$ $C^2$ and $G^1$ $G^2$, with the punch E and its groove $e$, and guide I, all arranged and operating as herein specified.

In testimony whereof I have hereunto set my hand this 22d day of February, 1872, in the presence of two subscribing witnesses.

CHARLES LAWRENCE STORY.

Witnesses:
    R. B. S. WHAYNE,
    F. E. PORTER.